United States Patent
Yoshimura et al.

(10) Patent No.: US 9,920,174 B2
(45) Date of Patent: Mar. 20, 2018

(54) THERMOPLASTIC RESIN SHAPED-ARTICLE, METHOD OF MANUFACTURING THE SAME, THERMOPLASTIC RESIN LIGHT GUIDE, LIGHT SOURCE DEVICE, AND LIQUID CRYSTAL DISPLAY DEVICE

(71) Applicant: MITSUBISHI RAYON CO., LTD., Chiyoda-ku (JP)

(72) Inventors: Tomonari Yoshimura, Yokohama (JP); Kenji Yagi, Otake (JP); Junichi Ikeno, Saitama (JP)

(73) Assignee: Mitsubishi Chemical Corporation, Chiyoda-ku (JP)

( * ) Notice: Subject to any disclaimer, the term of this patent is extended or adjusted under 35 U.S.C. 154(b) by 295 days.

(21) Appl. No.: 14/768,905

(22) PCT Filed: Feb. 24, 2014

(86) PCT No.: PCT/JP2014/054269
§ 371 (c)(1),
(2) Date: Aug. 19, 2015

(87) PCT Pub. No.: WO2014/132905
PCT Pub. Date: Sep. 4, 2014

(65) Prior Publication Data
US 2015/0376359 A1    Dec. 31, 2015

(30) Foreign Application Priority Data
Feb. 26, 2013 (JP) .................. 2013-035696

(51) Int. Cl.
*C08J 5/18* (2006.01)
*F21V 8/00* (2006.01)
(Continued)

(52) U.S. Cl.
CPC .......... *C08J 5/18* (2013.01); *B29D 11/00721* (2013.01); *G02B 6/0041* (2013.01);
(Continued)

(58) Field of Classification Search
CPC ........ C08J 5/18; G02B 6/0041; G02B 6/0051; G02B 6/0065; G02B 6/0073; B29D 11/00721
See application file for complete search history.

(56) References Cited

U.S. PATENT DOCUMENTS 4,195,907 A * 4/1980 Zamja .................. G02B 6/001
362/556
2008/0070998 A1 3/2008 Takada et al.
2010/0031544 A1 2/2010 Hwang

FOREIGN PATENT DOCUMENTS

JP    2006 32254      2/2006
JP    2006 155937     6/2006
(Continued)

OTHER PUBLICATIONS

International Search Report dated May 13, 2014 in PCT/JP2014/054269 Filed Feb. 24, 2014.

*Primary Examiner* — Thomas M Sember
(74) *Attorney, Agent, or Firm* — Oblon, McClelland, Maier & Neustadt, L.L.P.

(57) ABSTRACT

Provided are a thermoplastic resin shaped-article in which vacancies with satisfactory light emission efficiency are formed, and a thermoplastic resin light guide that uses the thermoplastic resin shaped-article.
Pulse laser irradiation is performed in a state in which the pulse laser is focused to an inner region of a primary thermoplastic resin shaped-article, thereby forming cracks at the inner side of the primary thermoplastic resin shaped-article. Then, a heat treatment is performed at a temperature equal to or higher than a glass transition temperature of a
(Continued)

20 THERMOPLASTIC RESIN SHAPED-ARTICLE
244 VACANCY thermoplastic resin that constitutes the primary thermoplastic resin shaped-article, thereby obtaining a thermoplastic resin shaped-article 20 in which substantially spherical vacancies 244 having minimum diameter of 30 μm or more are formed only at the inner region distant from a surface thereof by 10 μm or more.

20 Claims, 13 Drawing Sheets

(51) Int. Cl.
  *B29D 11/00* (2006.01)
  *B29K 33/00* (2006.01)
(52) U.S. Cl.
  CPC ......... *G02B 6/0051* (2013.01); *G02B 6/0065* (2013.01); *G02B 6/0073* (2013.01); *B29K 2033/08* (2013.01); *C08J 2205/044* (2013.01); *C08J 2333/12* (2013.01)

(56) References Cited

FOREIGN PATENT DOCUMENTS

| | | |
|---|---|---|
| JP | 2010 508544 | 3/2010 |
| JP | 2010 153103 | 7/2010 |

\* cited by examiner

| | | | |
|---|---|---|---|
| 100 | FEMTOSECOND LASER PROCESSING APPARATUS | 6 | OBJECTIVE LEN |
| 1 | FEMTOSECOND LASER LIGHT SOURCE | 7 | FEMTOSECOND LASER LIGHT |
| 2 | HALF-WAVELENGTH PLATE | 8 | PRIMARY THERMOPLASTIC RESIN MOLDED BODY |
| 3 | GLAN LASER PRISM | 9 | Z-AXIS STAGE |
| 4 | SHUTTER | 10 | AUTOMATIC TWO-AXIS STAGE |
| 5, 5', 5" | MIRROR | | |

24  THERMOPLASTIC RESIN LIGHT GUIDE
241 LIGHT INCIDENT END SURFACE
242 LIGHT EMITTING SURFACE
243 REAR SURFACE
244 VACANCY

22 LED
24 THERMOPLASTIC RESIN LIGHT GUIDE
26 LIGHT DIFFUSION ELEMENT
28 FIRST LIGHT DEFLECTION ELEMENT
30 SECOND LIGHT DEFLECTION ELEMENT
32 LIGHT REFLECTION ELEMENT
241 LIGHT INCIDENT END SURFACE
242 LIGHT EMITTING SURFACE
243 REAR SURFACE

900 CRACK-FORMED SHEET
501 CRACK

FIG. 12
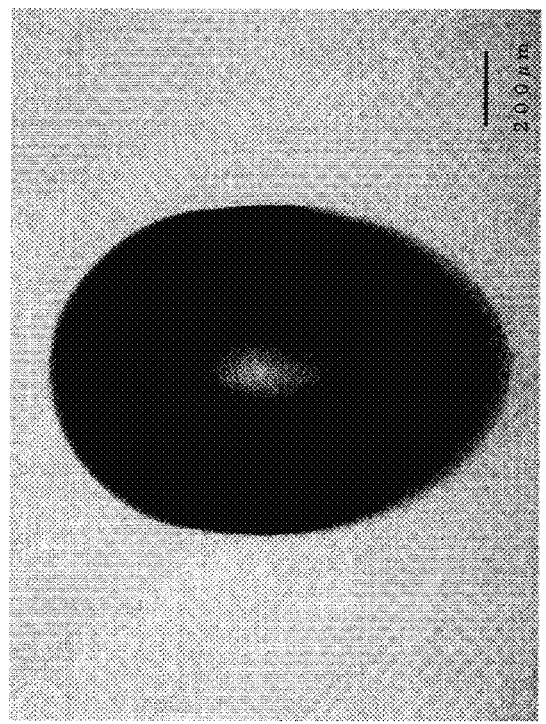
(OBSERVATION FROM Y-AXIS DIRECTION)
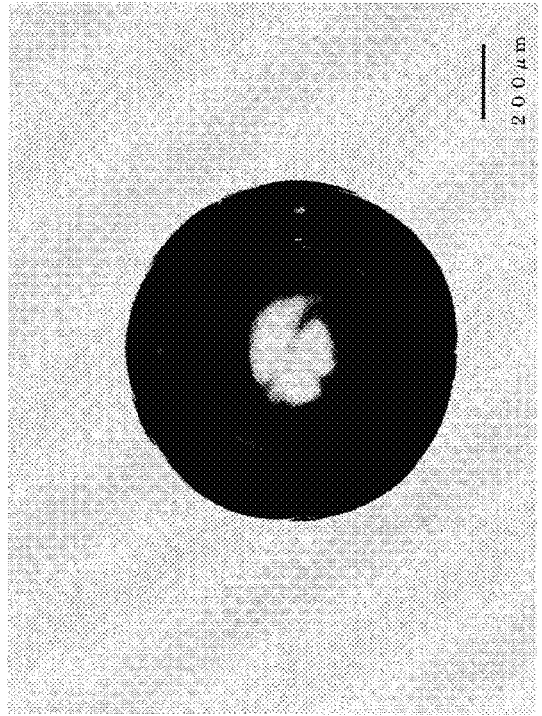
(OBSERVATION FROM Z-AXIS DIRECTION)

20 THERMOPLASTIC RESIN SHAPED-ARTICLE
244 VACANCY
1301 CORE
1302 CLAD

THERMOPLASTIC RESIN SHAPED-ARTICLE, METHOD OF MANUFACTURING THE SAME, THERMOPLASTIC RESIN LIGHT GUIDE, LIGHT SOURCE DEVICE, AND LIQUID CRYSTAL DISPLAY DEVICE

TECHNICAL FIELD

The present invention relates to a thermoplastic resin shaped-article, a method of manufacturing the same, a thermoplastic resin light guide, a light source device, and a liquid crystal display device.

BACKGROUND ART

Basically, the liquid crystal display device is constituted by a light source device, and a liquid crystal display element. As the light source device, an edge light type backlight (backlight source device) has been frequently used from the viewpoint of a reduction in size of the liquid crystal display device. In the edge light type backlight, at least one side end surface of a rectangular plate-shaped light guide is used as a light incident end surface, and a linear or rod-shaped primary light source such as a straight pipe type fluorescent lamp or a spot-shaped primary light source such as a light emitting diode (LED) is disposed along the light incident end surface. Light generated from the primary light source is allowed to be incident to the light incident end surface of the light guide, is guided to the inside of the light guide, and is emitted from a light emitting surface that is one surface of two main surface of the light guide. The light emitted from the light emitting surface of the light guide is diffused by a light diffusion element such as a light diffusion film that is disposed on the light emitting surface, and is deflected to a necessary direction by a light deflection element such as a prism sheet. Light is also emitted from a rear surface that is a main surface opposite to the light emitting surface of the light guide, and a light reflection element such as a light reflection sheet is disposed to face the rear surface so as to return the light to the light guide.

As the above-described light guide, a light guide, which is obtained by forming various optical functional structures in a thermoplastic resin shaped-article that is a material of the light guide, can be used. Examples of the optical functional structure include a light emission mechanism configured to emit light that is guided to the inside of the light guide.

As the light emission mechanism, there is disclosed a method of using bubbles which are formed by application of radiation energy and thermal energy (for example, refer to Patent Document 1).

CITATION LIST

Patent Document

Patent Document 1: JP 2006-155937

DISCLOSURE OF THE INVENTION

Problem to be Solved by the Invention

In accordance with high definition or low power consumption of the liquid crystal display device, it is demanded for the backlight to realize high-luminance light emission with a primary light source in which an amount of light is relatively small. Accordingly, in a light emission mechanism formed in the light guide that is a constituent member of the backlight, it is demanded to have a function of emitting light from the primary light source with high efficiency.

However, in the light guide disclosed in Patent Document 1, the bubbles which are formed at a predetermined density are used as the light emission mechanism. However, the diameter of the bubbles is 20 µm or less, and specifically, the diameter is as small as approximately 0.3 µm, and thus light emission efficiency of individual bubbles is low. Accordingly, it cannot be said that brightness is sufficient.

In addition, with regard to a method of manufacturing the light guide in Patent Document 1, it is necessary to add a specific additive that induces foaming for formation of bubbles.

In addition, in the method of manufacturing the light guide in Patent Document 1, bubbles are formed at a portion irradiated with radiation energy, and thus it is possible to control a bubble formation position in a radiation energy irradiation surface. However, it is difficult to control a bubble formation position in a depth direction parallel with a radiation energy irradiation direction.

An object of the invention is to provide a thermoplastic resin shaped-article in which vacancies with satisfactory light emission efficiency are formed, a thermoplastic resin light guide using the thermoplastic resin shaped-article, and a light source device and a liquid crystal display device which use the thermoplastic resin light guide.

Another object of the invention is to provide a method of manufacturing a thermoplastic resin shaped-article, in which vacancies with satisfactory light emission efficiency are formed, without using an additive.

Still another object of the invention is to provide a method of manufacturing a thermoplastic resin shaped-article in which vacancies with satisfactory light emission efficiency can be formed at an arbitrary position inside a shaped-article.

Means for Solving Problem

The above-described objects are accomplished by the following inventions [1] to [13].

[1] A thermoplastic resin shaped-article including substantially spherical vacancies having minimum diameter of 30 µm or more only at an inner region distant from a surface thereof by 10 µm or more.

[2] The thermoplastic resin shaped-article according to [1], wherein the thermoplastic resin shaped-article has transparency.

[3] A thermoplastic resin shaped-article that is obtained through a pulse laser irradiation process and a subsequent heat treatment process, wherein substantially spherical vacancies having minimum diameter of 30 µm or more are formed only at an inner region of the thermoplastic resin shaped-article which are distant from a surface thereof by 10 µm or more, in the pulse laser irradiation process, pulse laser irradiation is performed in a state in which the pulse laser is focused to an inner portion of a primary thermoplastic resin shaped-article which is distant from a surface thereof by 10 µm or more, and cracks are formed only at the inner region of the primary thermoplastic resin shaped-article, and in the heat treatment process, the primary thermoplastic resin shaped-article in which the cracks are formed is subjected to a heat treatment at a temperature equal to or higher than a glass transition temperature of a thermoplastic resin that constitutes the primary thermoplastic resin shaped-article, and substantially spherical vacancies having minimum diameter of 30 µm or more are formed only at the inner region of the primary thermoplastic resin shaped-article which is distant from the surface thereof by 10 µm or more.

[4] The thermoplastic resin shaped-article according to any one of [1] to [3], wherein a decomposition product gas of a thermoplastic resin, which constitutes a primary thermoplastic resin shaped-article, is included in the vacancies.

[5] A method of manufacturing a thermoplastic resin shaped-article, including a pulse laser irradiation process and a subsequent heat treatment process, wherein substantially spherical vacancies having minimum diameter of 30 µm or more are formed only at an inner region of the thermoplastic resin shaped-article which is distant from a surface thereof by 10 µm or more, in the pulse laser irradiation process, pulse laser irradiation is performed in a state in which the pulse laser is focused to an inner portion of a primary thermoplastic resin shaped-article which is distant from a surface thereof by 10 µm or more, and cracks are formed only at the inner region of the primary thermoplastic resin shaped-article, and in the heat treatment process, the primary thermoplastic resin shaped-article in which the cracks are formed is subjected to a heat treatment at a temperature equal to or higher than a glass transition temperature of a thermoplastic resin that constitutes the primary thermoplastic resin shaped-article, and substantially spherical vacancies having minimum diameter of 30 µm or more are formed only at the inner region of the primary thermoplastic resin shaped-article which is distant from the surface thereof by 10 µm or more.

[6] The method of manufacturing a thermoplastic resin shaped-article according to [5], wherein the pulse laser has a wavelength of 1080 nm or less, a pulse width of 200 femtoseconds or less, and energy of 5 µJ/pulse or more.

[7] The method of manufacturing a thermoplastic resin shaped-article according to [5] or [6], wherein a heat treatment time is 3 minutes to 30 minutes.

[8] The method of manufacturing a thermoplastic resin shaped-article according to any one of [5] to [7], wherein a heat treatment temperature is equal to or 30° C. higher than the glass transition temperature of the thermoplastic resin, which constitutes the primary thermoplastic resin shaped-article.

[9] A thermoplastic resin light guide that is obtained by using the thermoplastic resin shaped-article of any one of [1] to [4], including a light incident end surface, to which light to be guided to the inside, is incident and a light emitting surface from which the light guided to the inside is emitted, wherein a haze value is 5% or less.

[10] A thermoplastic resin light guide including a light incident end surface, to which light to be guided to the inside, is incident and a light emitting surface from which the light guided to the inside is emitted, wherein a haze value is 5% or less, and substantially spherical vacancies having minimum diameter of 30 µm or more are formed only at an inner region distant from the light emitting surface by 10 µm or more.

[11] The thermoplastic resin light guide according to [9] or [10], wherein the thermoplastic resin light guide has a core-clad structure.

[12] A light source device including the thermoplastic resin light guide according to [9] or [10] and a primary light source that is provided to the thermoplastic resin light guide, wherein the primary light source is disposed to be adjacent to the light incident end surface of the thermoplastic resin light guide.

[13] A light source device including the thermoplastic resin light guide according to [11], and a primary light source that is provided to the thermoplastic resin light guide, wherein the primary light source is disposed to be adjacent to the light incident end surface of the thermoplastic resin light guide.

[14] A liquid crystal display device including the light source device according to [12].

[15] A liquid crystal display device including the light source device according to [13].

Effect of the Invention

According to the invention, it is possible to provide a thermoplastic resin shaped-article in which vacancies with satisfactory light emission efficiency are formed, and a thermoplastic resin light guide using the thermoplastic resin shaped-article.

In addition, when using the thermoplastic resin light guide, it is possible to provide a light source device and a liquid crystal display device which are capable of realizing high-luminance light emission.

In addition, according to the invention, it is possible to provide a method of manufacturing a thermoplastic resin shaped-article in which vacancies with satisfactory light emission efficiency can be formed without using an additive, and thus a reduction in cost is attained.

In addition, according to the method of manufacturing a thermoplastic resin shaped-article of the invention, it is possible to form vacancies with satisfactory light emission efficiency at an arbitrary position inside the thermoplastic resin shaped-article, and thus it is possible to provide a thermoplastic resin shaped-article capable of emitting light, which is transferred from a primary light source, with high efficiency.

For example, the light source device constructed by using the thermoplastic resin light guide of the invention is preferable as a backlight of a liquid crystal display device such as a monitor of a PC and the like, and a liquid crystal television; and a light source that is used in an illumination device such as an indoor illumination device including a ceiling light, and an illuminated sign board.

In addition, the thermoplastic resin shaped-article of the invention can also be used as a diffusion plate of the liquid crystal display device such as the monitor of the PC and the like, and the liquid crystal television; a diffusion plate that is used in the illumination device such as the indoor illumination device including the ceiling light, and the illuminated sign board; and a design plate such as a building material, a signboard, and a face plate.

BRIEF DESCRIPTION OF DRAWINGS

FIG. 12 is an optical microscope photograph illustrating an embodiment of a vacancy portion of a thermoplastic resin shaped-article that is manufactured in Reference Example 2.

MODES FOR CARRYING OUT THE INVENTION

<Thermoplastic Resin Shaped-Article>

Figure 1:
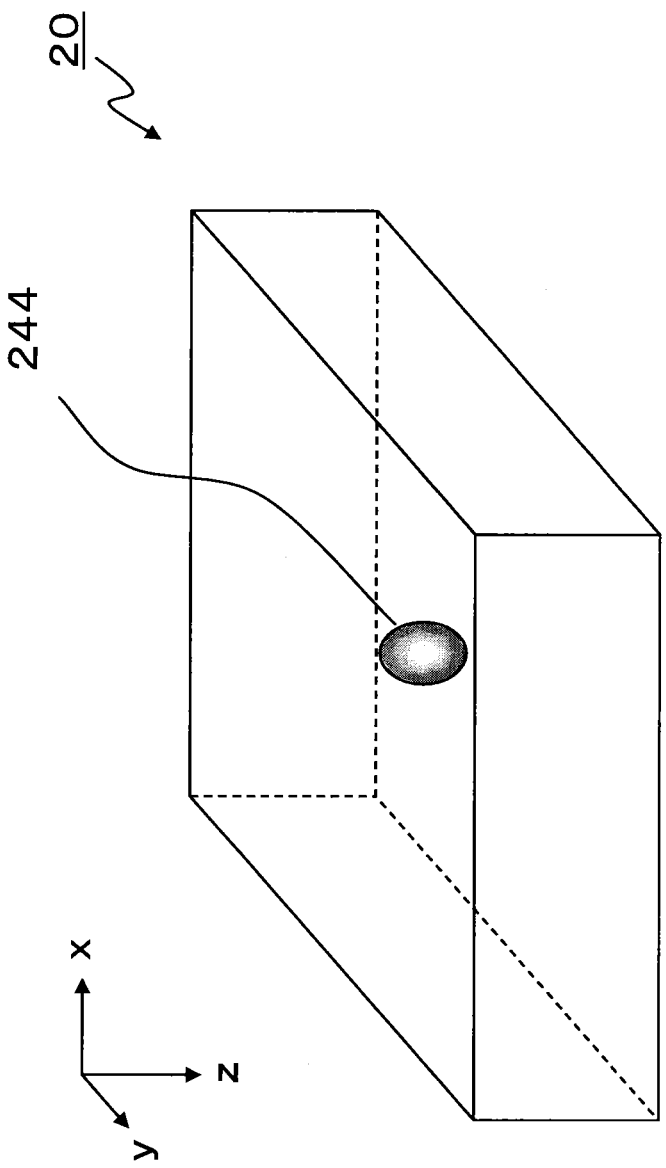
FIG. 1 is a schematic perspective view illustrating an embodiment of a thermoplastic resin shaped-article of the invention.

A thermoplastic resin shaped-article according to embodiments of the invention has substantially spherical vacancies having minimum diameter of 30 μm or more only at an inner region of the thermoplastic resin shaped-article which is distant from a surface thereof by 10 μm or more.

Examples of the thermoplastic resin that constitutes the thermoplastic resin shaped-article include an acrylic resin, a polycarbonate resin, a methacrylic acid ester-styrene copolymer (MS resin), a cyclic olefin resin (COP), an ABS resin, and the like. As a thermoplastic resin in a case where the thermoplastic resin shaped-article is used for an optical use, the acrylic resin, which has high light transmitting property at a wide wavelength region, is preferable.

The thermoplastic resin shaped-article may be in various shapes in accordance with the use of the thermoplastic resin shaped-article. As the shape of the thermoplastic resin shaped-article in a case where the thermoplastic resin shaped-article is used as a light guide, a plate shape can be exemplified.

As the thermoplastic resin shaped-article, a thermoplastic resin shaped-article having transparency in accordance with a use may be used. For example, in a case where the thermoplastic resin shaped-article is used as the light guide, it is preferable that the thermoplastic resin shaped-article have transparency in which a haze value is 5% or less.

<Vacancy>

In an embodiment of the invention, the vacancy is a space that is present inside the thermoplastic resin shaped-article or a thermoplastic resin light guide to be described later. For example, the vacancy can be formed by expanding a crack, which occurs due to depolymerization, thermal decomposition, and the like in the thermoplastic resin that constitutes the thermoplastic resin shaped-article or the thermoplastic resin light guide, by using heat. In this case, a decomposition product gas of the thermoplastic resin is present in the vacancy.

The vacancies are present only at an inner region of the thermoplastic resin shaped-article or the thermoplastic resin light guide which is distant from a surface thereof by 10 μm or more. When the vacancies are present only at the inner region of the thermoplastic resin shaped-article or the thermoplastic resin light guide which is distant from the surface thereof by 10 μm or more, it is possible to suppress glaring of light that is emitted from the light guide. It is preferable that the vacancies be present only at the inner region of the thermoplastic resin shaped-article or the thermoplastic resin light guide which is distant from the surface thereof by 20 μm or more, and more preferably 30 μm or more.

The minimum diameter of the vacancy is 30 μm or more. When the minimum diameter of the vacancy is set to 30 μm or more, it is possible to attain satisfactory light emission efficiency when using the thermoplastic resin shaped-article as the thermoplastic resin light guide. On the other hand, it is preferable that the minimum diameter of the vacancy be 50 μm or more, and more preferably 70 μm or more. It is preferable that the maximum diameter of the vacancy be 20 mm or less in consideration of suppression of a luminance spot of light that is emitted from the light guide. In a case where the thermoplastic resin shaped-article is used as the thermoplastic resin light guide that makes much account of optical transparency, it is preferable that the maximum diameter of the vacancy be 1 mm or less. In addition, in a case where the thermoplastic resin shaped-article is used as a thermoplastic resin design plate that makes much account of design properties, it is preferable that the maximum diameter of the vacancy be 20 mm or less.

Hereinafter, description will be given of the minimum diameter of the vacancy with reference to FIG. 1. FIG. 1 is a schematic perspective view illustrating an embodiment of the thermoplastic resin shaped-article of the invention. Here, in a case where a thermoplastic resin shaped-article 20 has a plate shape, a thickness direction thereof is set as a z-axis, and directions which are perpendicular to each other and are perpendicular to the z-axis are set as an x-axis direction and a y-axis direction. In this embodiment of the invention, when observing a vacancy 244 from the z-axis direction and the y-axis direction, the smallest width of the vacancy 244 is set as the minimum diameter, and the largest width of the vacancy 244 is set as the maximum diameter. In addition, an aspect ratio is a value obtained by dividing the maximum diameter by the minimum diameter.

Description of the minimum diameter and the aspect ratio is similarly applicable to a vacancy that is present inside the thermoplastic resin light guide.

The shape of the vacancy is a substantially spherical shape. The "substantially spherical shape" represents that the shape is close to a sphere, and a corner is not present. When the shape of the vacancy is set to the substantially spherical shape, it is possible to attain satisfactory light emission efficiency when using the thermoplastic resin shaped-article as the thermoplastic resin light guide. It is preferable that the aspect ratio of the vacancy be 3 or less.

<Primary Thermoplastic Resin Shaped-Article>

A primary thermoplastic resin shaped-article represents a material that is used to obtain the thermoplastic resin shaped-article, and corresponds to a material in a stage before the vacancies are formed. The primary thermoplastic resin shaped-article may be used in various shapes in accordance with a use of the thermoplastic resin shaped-article. For example, in a case where the thermoplastic resin shaped-article is used as the light guide, as the shape of the primary thermoplastic resin shaped-article, a plate shape can be exemplified.

As the thermoplastic resin shaped-article, a thermoplastic resin shaped-article having transparency in accordance with a use may be used. For example, in a case where the thermoplastic resin shaped-article is used as the light guide, it is preferable that the primary thermoplastic resin shaped-article have transparency in which a haze value is 5% or less.

<Method of Manufacturing Thermoplastic Resin Shaped-Article>

Examples of a method of manufacturing the thermoplastic resin shaped-article include a method of manufacturing the thermoplastic resin molded by through a process (pulse laser irradiation process) of performing pulse laser irradiation in a state in which the pulse laser is focused to an inner region of the primary thermoplastic resin shaped-article which is distant from a surface thereof by 10 μm or more to form cracks only at the inner region of the primary thermoplastic resin shaped-article, and a process (heat treatment process) of subjecting the primary thermoplastic resin shaped-article, in which the cracks are formed, to a heat treatment at a temperature equal to or higher than a glass transition temperature of a thermoplastic resin that constitutes the primary thermoplastic resin shaped-article to form substantially spherical vacancies having minimum diameter of 30 μm or more only at the inner region of the primary thermoplastic resin shaped-article which is distant from the surface thereof by 10 μm or more.

(Pulse Laser Irradiation Process)

In the pulse laser irradiation process, pulse laser irradiation is performed in a state in which the pulse laser is focused to an inner portion of the primary thermoplastic resin shaped-article which is distant from a surface thereof by 10 μm or more, thereby forming a crack at a target portion inside the primary thermoplastic resin shaped-article. A position of the focus of the pulse laser may be set to an arbitrary position and an arbitrary depth inside the primary thermoplastic resin shaped-article in accordance with an object.

When forming the crack only at an inner region of the primary thermoplastic resin shaped-article which is distant from a surface thereof by 10 μm or more, it is preferable to use a pulse laser having a wavelength capable of penetrating through the thermoplastic resin that constitutes the primary thermoplastic resin shaped-article, and it is preferable to use a pulse laser having a pulse width at which photon absorption occurs in a large amount. When performing irradiation by using the pulse laser having the wavelength and the pulse width in a state in which the pulse laser is focused to an inner region of the primary thermoplastic resin shaped-article, irradiation energy can be focused to a target position. As a result, the photon absorption occurs in a large amount, and thus the thermoplastic resin that constitutes the primary thermoplastic resin shaped-article is depolymerized or is thermally decomposed, thereby forming a crack at the target position inside the primary thermoplastic resin shaped-article.

For example, in a case where an acrylic resin is used as the thermoplastic resin that constitutes the primary thermoplastic resin shaped-article, as the pulse laser, a pulse laser, which has a pulse width of 20 nanoseconds or less at a wavelength of 350 nm to 1080 nm, can be used. For example, in the case of the pulse laser having a pulse width of 20 nanoseconds or less, pulse lasers having wavelengths of 355 nm, 525 nm, 780 nm, 790 nm, 808 nm, 830 nm, and 1064 nm may be exemplified. In addition, in the case of a pulse laser having a pulse width of 200 femtoseconds or less, pulse lasers having wavelengths of 780 nm, 790 nm, 808 nm, and 830 nm may be exemplified.

As an output of the pulse laser increases, the size of the crack has a tendency to increase. In addition, as the number of irradiation pulses increases, the size of the crack has a tendency to increase. Accordingly, it is possible to adjust the size of the crack by controlling the output of the pulse laser and the number of irradiation pulses.

As the pulse laser, a pulse laser, which has a pulse width of 200 femtoseconds or less and energy of 5 μJ/pulse or more at a wavelength of 1080 nm or less, is preferable so as to cut out a molecular bond of the primary thermoplastic resin shaped-article.

Figure 2:
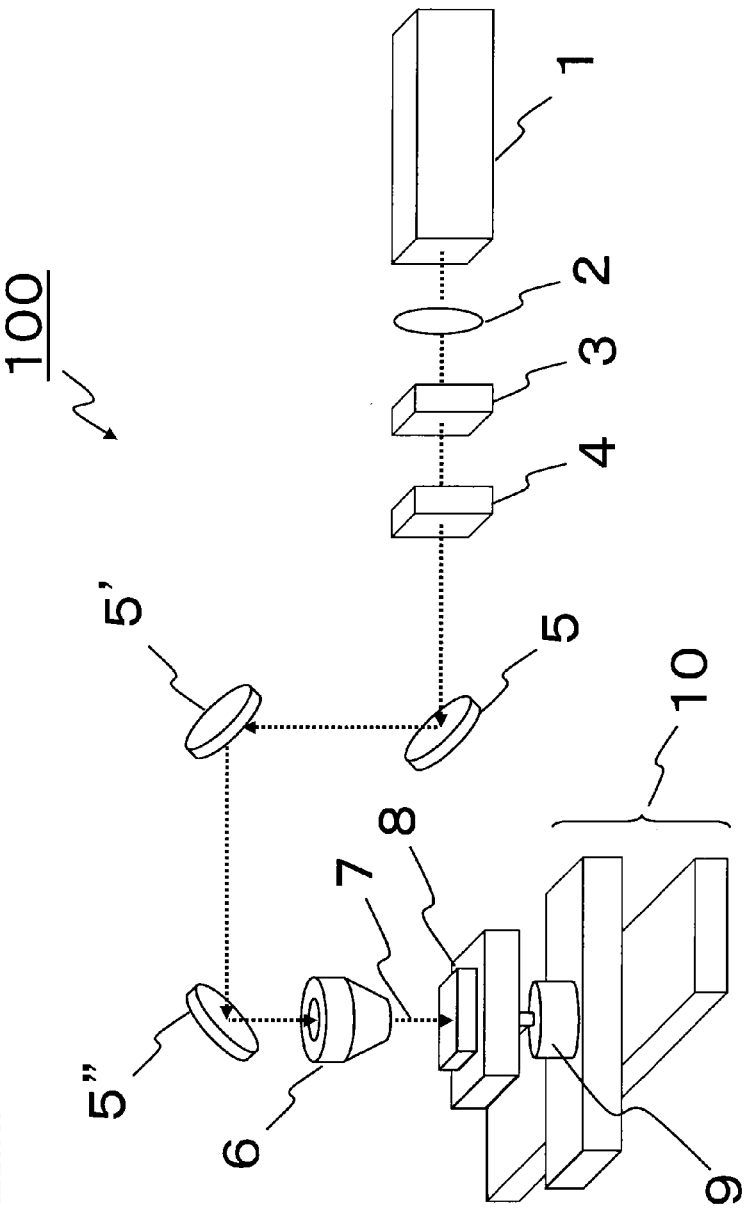
FIG. 2 is a schematic view illustrating an embodiment of a femtosecond laser processing apparatus that is used for pulse laser irradiation.

Examples of an apparatus of irradiating the primary thermoplastic resin shaped-article with the pulse laser include a femtosecond laser processing apparatus 100 illustrated in FIG. 2.

In FIG. 2, the femtosecond laser processing apparatus 100 includes a femtosecond laser light source 1, a half-wavelength plate 2, a Glan laser prism 3, a shutter 4, mirrors 5, 5', and 5", an objective lens 6, a z-axis stage 9, and an automatic two-axis stage 10. A primary thermoplastic resin shaped-article 8 that is an object to be processed is placed on the z-axis stage 9.

Irradiation of femtosecond laser light 7, which is generated from the femtosecond laser light source 1, is performed in a state in which the laser light 7 is focused to a predetermined position inside the primary thermoplastic resin shaped-article 8 in the z-axis stage 9 after passing through the half-wavelength plate 2, the Glan laser prism 3, the shutter 4, the mirrors 5, 5', and 5", and the objective lens 6. Incidentally, the number of irradiation pulses of the femtosecond laser is set by changing a laser irradiation time using the shutter 4. In addition, adjustment of the focal position is performed by the z-axis stage 9 and the automatic two-axis stage 10.

(Heat Treatment Process)

In the heat treatment process, the primary thermoplastic resin shaped-article in which the cracks are formed at the inside thereof is subjected to a heat treatment at a temperature equal to or higher than a glass transition temperature of the thermoplastic resin that constitutes the primary thermoplastic resin shaped-article. According to this, the crack is grown into a vacancy and thus it is possible to obtain a thermoplastic resin shaped-article having substantially spherical vacancies having the minimum diameter of 30 μm or more only at the inside.

The size of the vacancy can be adjusted by controlling the size of the crack. As the size of the crack that is formed in the pulse laser irradiation process increases, the vacancy has a tendency to increase.

The position of the vacancy inside the thermoplastic resin shaped-article is basically the same as the position of the crack that is formed inside the primary thermoplastic resin shaped-article, and thus it is possible to adjust the position at which the vacancy is formed in accordance with the position at which the crack is formed. In this embodiment of the invention, it is possible to control the position at which the crack is formed inside the primary thermoplastic resin shaped-article in accordance with the focal position of the pulse laser, and thus it is possible to form the vacancy at an arbitrary position inside the thermoplastic resin shaped-article.

It is preferable that a temperature during the heat treatment with respect to the primary thermoplastic resin shaped-article be equal to or higher than the glass transition temperature of the thermoplastic resin that constitutes the primary thermoplastic resin shaped-article. When the temperature during the heat treatment with respect to the primary thermoplastic resin shaped-article is set to be equal to or higher than the glass transition temperature of the thermoplastic resin, the thermoplastic resin is softened, and thus it is possible to grow the vacancy in a short time. It is more preferable that the temperature during the heat treatment with respect to the primary thermoplastic resin shaped-article be equal to or 30° C. higher than the glass transition temperature of the thermoplastic resin, and still more preferably equal to or 50° C. higher than the glass transition temperature of the thermoplastic resin.

As the heat treatment temperature is raised, the growth rate of the vacancy has a tendency to be fast, but a variation in the size of the vacancy that is grown has a tendency to increase. On the other hand, as the heat treatment temperature is lowered, the growth rate of the vacancy has a tendency to be slow, but the variation in the size of the vacancy that is grown has a tendency to decrease.

In addition, as a heat treatment time is lengthened, the vacancy has a tendency to be large, and the vacancy has a tendency to be close to a spherical shape in which the aspect ratio is 1. It is preferable that the heat treatment time be 3 minutes or longer from the viewpoint of decreasing the variation in the size of the vacancy, and be 30 minutes or shorter from the viewpoint of improving productivity.

Examples of the heat treatment method include a method of performing the heat treatment by using a heating furnace such as a hot air dryer, a method of performing the heat treatment with a heat ray of an infrared heater, and the like, and a method of performing the heat treatment through contact with a thermal medium such as a high-temperature metal plate.

A portion which is subjected to the heat treatment process, may be the entirety of the primary thermoplastic resin shaped-article or only a portion at which the vacancy is to be formed.

In the heat treatment process, for example, it is preferable to perform the heat treatment in a state in which the primary thermoplastic resin shaped-article is suspended, or a state in which the primary thermoplastic resin shaped-article is fixed by a holder in such a manner that the outer peripheral portion of the primary thermoplastic resin shaped-article is pinched so as to suppress deformation of the primary thermoplastic resin shaped-article. In this embodiment of the invention, an unnecessary portion of the thermoplastic resin shaped-article may be trimmed after the heat treatment process as necessary.

<Thermoplastic Resin Light Guide>

The thermoplastic resin light guide according to this embodiment of the invention has a light incident end surface to which light to be guided to the inside of the thermoplastic resin light guide is incident, and a light emitting surface from which the light guided to the inside of the thermoplastic resin light guide is emitted. A haze value is 5% or less, and substantially spherical vacancies having minimum diameter of 30 μm or more are formed only at an inner region distant from the light emitting surface by 10 μm or more. Incidentally, it is preferable that the haze value of the thermoplastic resin light guide be 5% or less in consideration of transparency. In addition, the thermoplastic resin shaped-article may be used in the thermoplastic resin light guide.

Examples of the thermoplastic resin that constitutes the thermoplastic resin light guide include an acrylic resin, a polycarbonate resin, a methacrylic acid ester-styrene copolymer (MS resin), and a cyclic olefin resin (COP). Among these, the acrylic resin, which has high light transmitting property at a wide wavelength region, is preferable.

Examples of a plate-shaped thermoplastic resin raw material that is used to obtain the thermoplastic resin light guide include a shaped-article that is manufactured by a thermal melting process such as an injection molding method or an extrusion molding method by using, for example, an acrylic resin pellet as a raw material, and an acrylic cast sheet that is manufactured by a cast polymerization method by using an acrylic monomer as a raw material.

Figure 3:
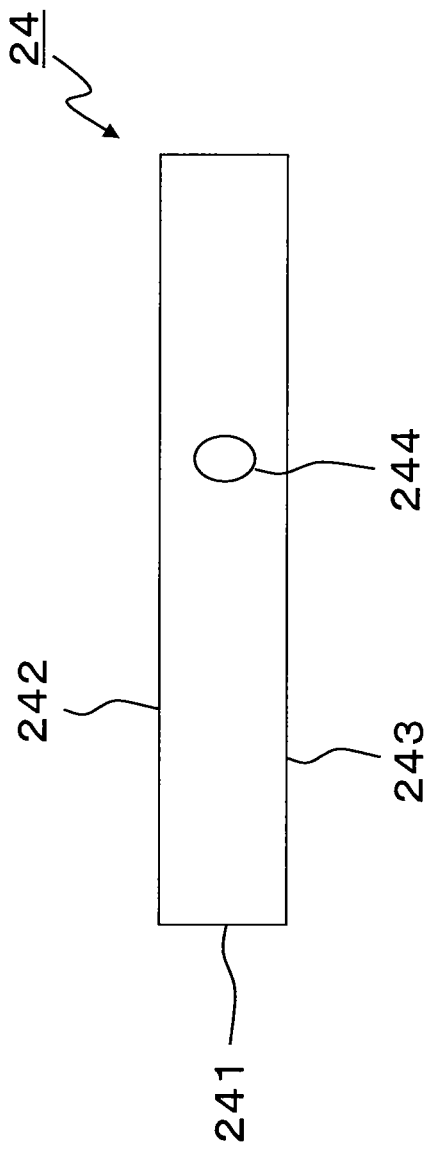
FIG. 3 is a schematic cross-sectional view illustrating an embodiment of the thermoplastic resin light guide of the invention.

FIG. 3 is a schematic cross-sectional view illustrating an embodiment of the thermoplastic resin light guide of the invention.

A thermoplastic resin light guide 24 extends in a direction perpendicular to a paper plane with an upper and lower direction in FIG. 3 set as a thickness direction, and has a rectangular plate shape as a whole. The thermoplastic resin light guide 24 includes a light incident end surface 241. A primary light source is disposed to be adjacent to the light incident end surface 241. One surface among four side end surfaces of the thermoplastic resin light guide 24 becomes the light incident end surface 241. The thermoplastic resin light guide 24 includes a light emitting surface 242 as one main surface, and a rear surface 243 as an opposite main surface. On the other hand, in this embodiment, only an upper surface is set as the light emitting surface 242, but both surfaces may be set as the light emitting surface 242. In addition, in this embodiment, a thermoplastic resin light guide in which the light emitting surface 242 is formed as a smooth surface (mirror surface) is exemplified, but there is no limitation thereto. Various functionalization shapes such as a prism shape, a lenticular lens shape, and a micro-lens shape may be formed in the light emitting surface.

The thermoplastic resin light guide 24 has vacancies 244 at the inside thereof.

For example, a gas such as a decomposition product gas of the thermoplastic resin that constitutes the primary thermoplastic resin shaped-article having a refractive index greatly different from that of the thermoplastic resin that constitutes the primary thermoplastic resin shaped-article is included in the vacancy 244, and thus the vacancy 244 functions as a diffusion portion with respect to transmission and reflection of light. According to this, light, which is incident to the light incident end surface 241 and is guided to the inside of the thermoplastic resin light guide 24, is diffracted, reflected, or scattered in the vacancy 244, and a part of the light is emitted from the light emitting surface 242. Accordingly, the vacancy 244 functions as a light emitting mechanism that emits the light, which is guided to the inside of the thermoplastic resin light guide 24, from the light emitting surface.

A plurality of the vacancies 244 may be provided at arbitrary positions inside the thermoplastic resin light guide 24, and it is possible to appropriately adjust the number of the vacancies 244 and an arrangement pattern thereof so as to obtain desired optical performance. Examples of the arrangement pattern of the vacancy 244 include a random shape, a checkered shape, and a closest packing shape.

In addition, the vacancy 244 may be formed at a partial region of the thermoplastic resin light guide 24, or may be formed across the entire region thereof.

An additional light emitting mechanism may be formed on at least one of the light emitting surface 242 and the rear surface 243 of the thermoplastic resin light guide 24 as necessary. Examples of the additional light emitting mechanism include a micro convex-concave structure, and dots obtained by printing a light scattering ink.

For example, the thickness of the thermoplastic resin light guide 24 is 0.1 mm to 10 mm.

As the thermoplastic resin light guide 24, thermoplastic resin light guides having various cross-sectional shapes such as a wedge shape, in which the thickness gradually decreases from the light incident end surface 241 to an opposite end surface, may be used in addition to a plate-shaped thermoplastic resin light guide in which the thickness is entirely the same as illustrated in FIG. 3. For example, the thermoplastic resin light guide can be obtained by using a primary thermoplastic resin shaped-article manufactured by the injection molding method.

A color of the thermoplastic resin light guide 24 may be selected in accordance with a purpose. For example, in a case where a color of the primary light source is emitted as is, a colorless and transparent thermoplastic resin light guide is preferable from the viewpoint of light transmittance thereof. In addition, in a case where it is desired to emit a color different from that of the primary light source, a colored thermoplastic resin light guide may be used.

Figure 13:
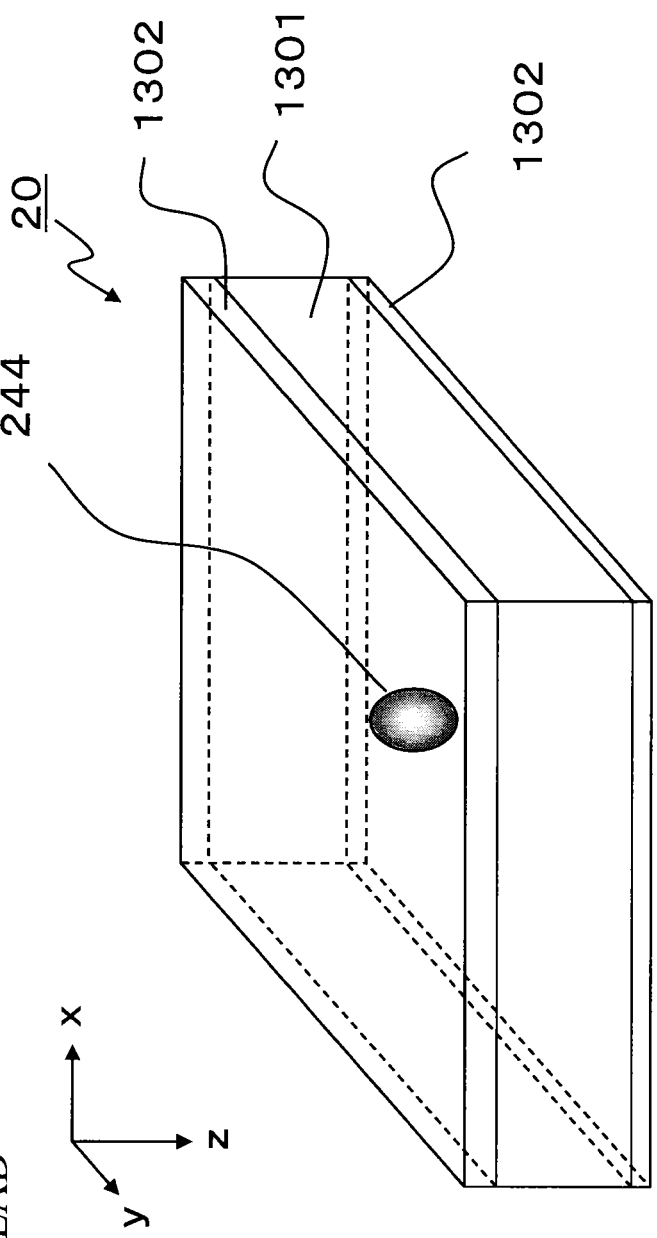
FIG. 13 is a schematic perspective view illustrating an embodiment of the thermoplastic resin shaped-article of the invention.

For example, as illustrated in FIG. 13, the thermoplastic resin shaped-article may be constructed as a multi-layered plate-shaped body as necessary. A thermoplastic resin shaped-article 20 illustrated in FIG. 13 has a core-clad structure as a three-layer structure including a clad 1302 that is a low-refractive-index resin layer, a core 1301 that is a high-refractive-index resin layer, and a clad 1302 that is a low-refractive-index resin layer. According to this structure, even when the surface of the thermoplastic resin shaped-article 20 is contaminated by dust or a fingerprint, it is possible to give characteristics in which the contamination is inconspicuous. With regard to the material of the core and the clad, it is possible to select an arbitrary combination such as a combination in which the core is formed from an acrylic resin and the clad is formed form polyvinylidene fluoride, and a combination in which the core is formed from a polycarbonate resin and the clad is formed from the acrylic resin as long as a refractive index of a material of the clad is lower than a refractive index of a material of the core.

The thermoplastic resin light guide can be manufactured using the primary thermoplastic resin shaped-article by the same method as the method of manufacturing the thermoplastic resin shaped-article.

<Primary Light Source>

Examples of the primary light source that is used in this embodiment of the invention include white light and colored light. Examples of the white light include a white LED. Examples of the colored light include colored LED. Specific examples of the white LED include NSSW020BT (product name, manufactured by NICHIA CORPORATION). Specific examples of the colored LED include NESB064 (product name, manufactured by NICHIA CORPORATION).

<Light Source Device>

In the light source device according to this embodiment of the invention, the thermoplastic resin light guide is provided with the primary light source, and the primary light source is disposed to be adjacent to the light incident end surface of the thermoplastic resin light guide.

Figure 4:
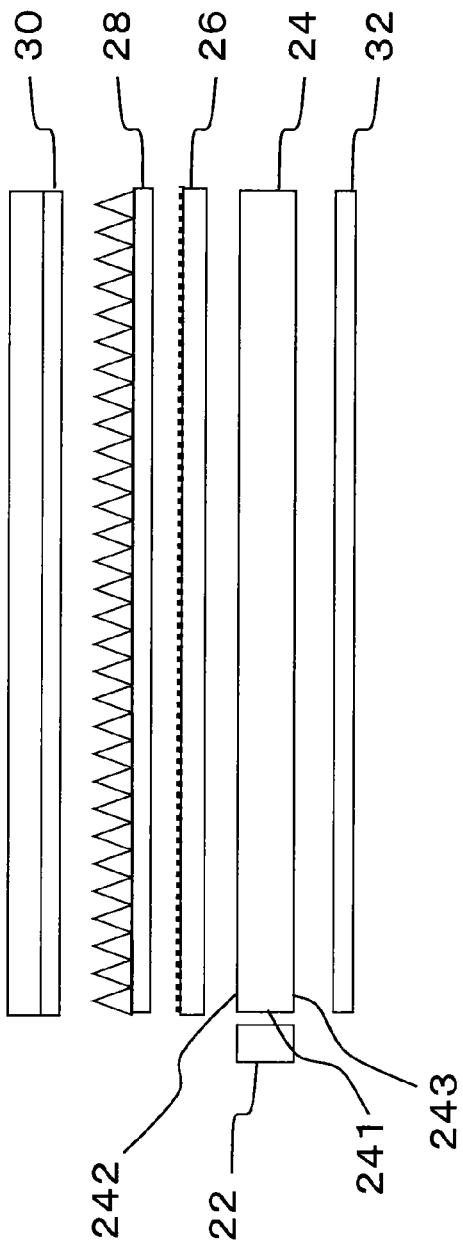
FIG. 4 is a schematic cross-sectional view illustrating an embodiment of the light source device of the invention.

FIG. 4 is a schematic cross-sectional view illustrating one embodiment of the light source device of the invention.

In FIG. 4, an LED 22 is provided as the primary light source, and a plurality of LEDs 22 may be provided. In the case of providing the plurality of LEDs 22, the LEDs 22 may be disposed in a direction perpendicular to a paper plane in FIG. 4 at a desired interval. Incidentally, in the case of providing the plurality of LEDs 22, it is preferable to dispose the LEDs 22 in such a manner that a maximum-intensity direction of light that is generated from each of the LEDs 22 becomes parallel in each case.

A light diffusion element 26 is disposed on the light emitting surface 242 of the thermoplastic resin light guide 24. In a case where directivity of the light that is emitted from the light emitting surface 242 has a desired emission angle and a desired viewing angle, the light diffusion element 26 may be omitted. Examples of the light diffusion element 26 include a light diffusion film.

A first light deflection element 28 is disposed on the light diffusion element 26, and a second light deflection element 30 is disposed on the first light deflection element 28. Examples of the first light deflection element 28 or the second light deflection element 30 include an upward prism sheet. The first light deflection element 28 and the second light deflection element 30 may be either the same type or different types.

In the first light deflection element 28 and the second light deflection element 30, ridge lines of a plurality of prism rows of light emitting surfaces are perpendicular to each other. The ridge line of the plurality of prism rows of the light emitting surface in the first light deflection element 28 is parallel with the light incident end surface 241, and the ridge line of the plurality of prism rows of the light emitting surface in the second light deflection element 30 is perpendicular to the light incident end surface 241. In addition, both of the ridge line of the plurality of prism rows of the light emitting surface in the first light deflection element 28, and the ridge line of the plurality of prism rows of the light emitting surface in the second light deflection element 30 may be inclined to the light incident end surface 241 or may be perpendicular thereto.

For example, the thickness of the first light deflection element 28 and the second light deflection element 30 is 30 µm to 350 µm.

In a case where directivity of light that is emitted from the light emitting surface 242 has a desired emission angle and a desired viewing angle, at least one of the first light deflection element 28 and the second light deflection element 30 may be omitted.

A light reflection element 32 is disposed under the rear surface 243. Examples of the light reflection element 32 include light reflection sheets such as a plastic sheet having a metal deposited reflection layer on a surface, a pigment-containing white sheet, and a foamed sheet. Examples of the pigment include titanium oxide, barium sulfate, calcium carbonate, and magnesium carbonate. On the other hand, in a case where an amount of light emitted from the rear surface 243 is as small as negligible, the light reflection element 32 may be omitted.

In the light source device according to this embodiment of the invention, a light reflection element that is the same as the light reflection element 32 may be disposed on a side end surface other than the light incident end surface 241 of the thermoplastic resin light guide 24 as necessary.

<Liquid Crystal Display Device>

The liquid crystal display device according to this embodiment of the invention is provided with the light source device according to this embodiment of the invention, and examples thereof include a liquid crystal display device in which the liquid crystal display element is disposed on the light source device illustrated in FIG. 4.

EXAMPLES

Hereinafter, the invention will be described with reference to examples.

<Evaluation of Vacancy and Crack>

Vacancies that are formed inside the thermoplastic resin shaped-article or the thermoplastic resin light guide was observed from the z-axis direction and the y-axis direction in the same manner as in the case of the vacancy illustrated in FIG. 1 by using an optical microscope (product name: IC inspection microscope ECLIPSE L200N, manufactured by Nikon Corporation). When observing from the z-axis direction and the y-axis direction, the smallest width of the vacancy was set as the minimum diameter, and the largest width was set as the maximum diameter. In addition, a value obtained by dividing the maximum diameter by the minimum diameter was set as an aspect ratio. Incidentally, the minimum diameter and the aspect ratio represent an average value of minimum diameters and an average value of aspect ratios in three cracks which are arbitrarily selected among 16 cracks, respectively.

In addition, evaluation of the crack was also performed by the same method as in the case of the vacancy.

<Measurement of Normal Luminance>

Light emission efficiency of the vacancy was evaluated through the following measurement of normal luminance by using a light source device.

Figure 5:
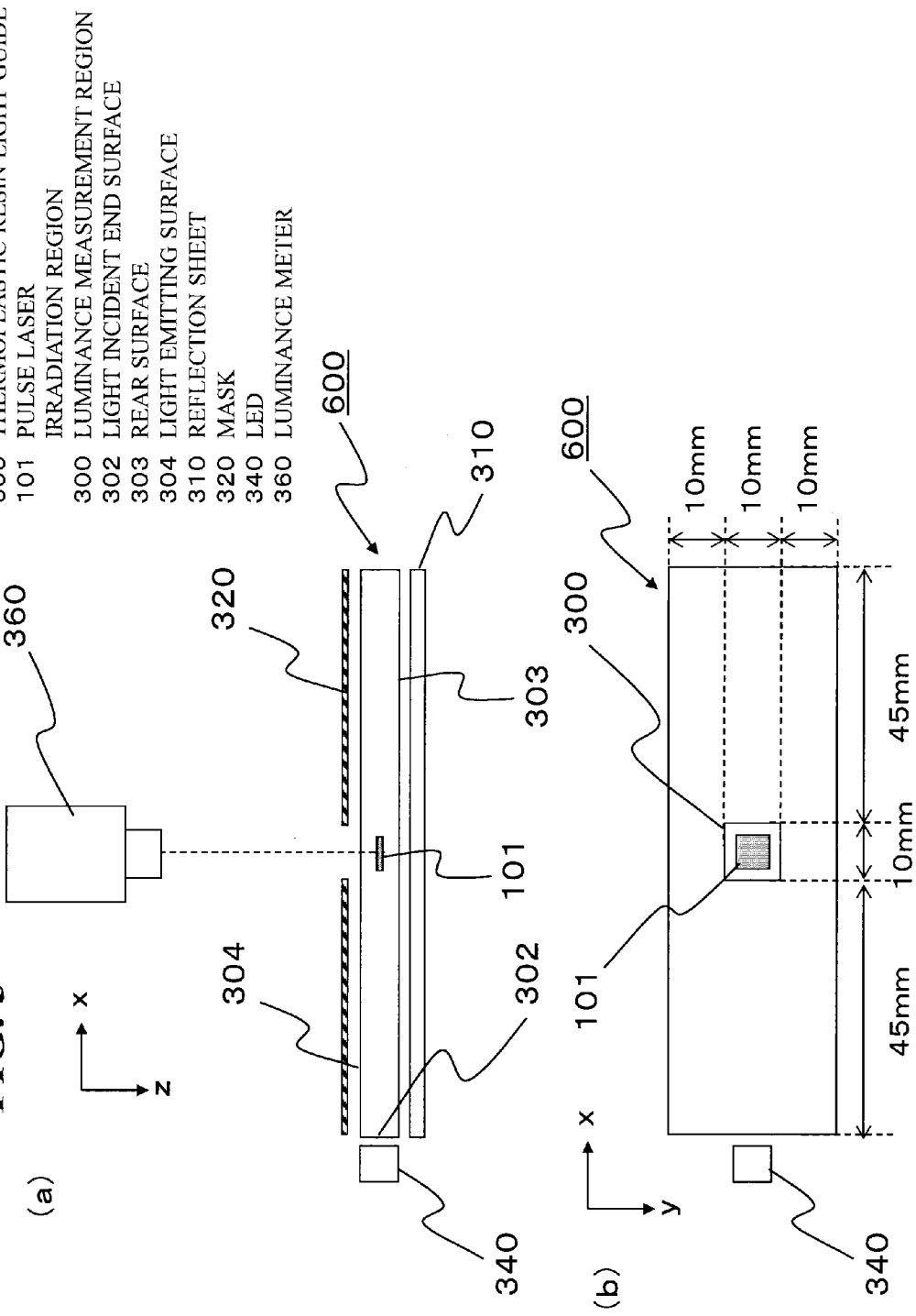
FIG. 5 is a schematic view illustrating an embodiment of an apparatus of measuring normal luminance of a thermoplastic resin light guide.

A region other than a luminance measurement region of a light emitting surface of the light source device having a structure illustrated in FIG. 5 was covered with a black mask, an LED 340 as a primary light source was made to emit light with 20 mA, and the normal luminance of light emitted from a luminance measurement region 300 was measured by using a luminance meter 360 (product name: color luminance meter BM-7, manufactured by TOPCON TECHNOHOUSE CORPORATION). Incidentally, the normal luminance represents a relative value of a case where normal luminance when using a crack-formed sheet before obtaining the thermoplastic resin light guide instead of the thermoplastic resin light guide is set to 1.0.

(Manufacturing Example 1) Manufacturing of Femtosecond Laser Processing Apparatus The femtosecond laser processing apparatus 100 illustrated in FIG. 2 was manufactured by using Integra-c (product name, wavelength: 790 nm, pulse width: 120 femtoseconds, pulse frequency: 1 kHz, manufactured by QUANTRONIX CORPORATION) as the laser light source 1.

Example 1

An acrylic extruded sheet having a thickness of 3 mm was manufactured by using an acrylic resin pellet (product name: Acrypet VH6#001, mass-average molecular weight: 86000, glass transition temperature: 110° C., manufactured by Mitsubishi Rayon Co., Ltd.) as a raw material. Subsequently, the acrylic extruded sheet was cut into a rectangular shape having dimensions of 160 mm×100 mm, thereby obtaining a primary thermoplastic resin shaped-article.

Figure 6:
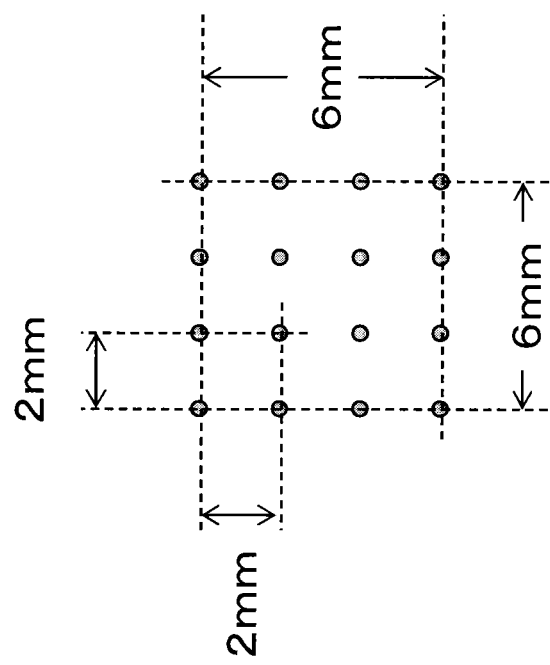
FIG. 6 is a schematic view illustrating an embodiment of vacancy arrangement of the thermoplastic resin light guide that is manufactured in Examples.
Figure 7:
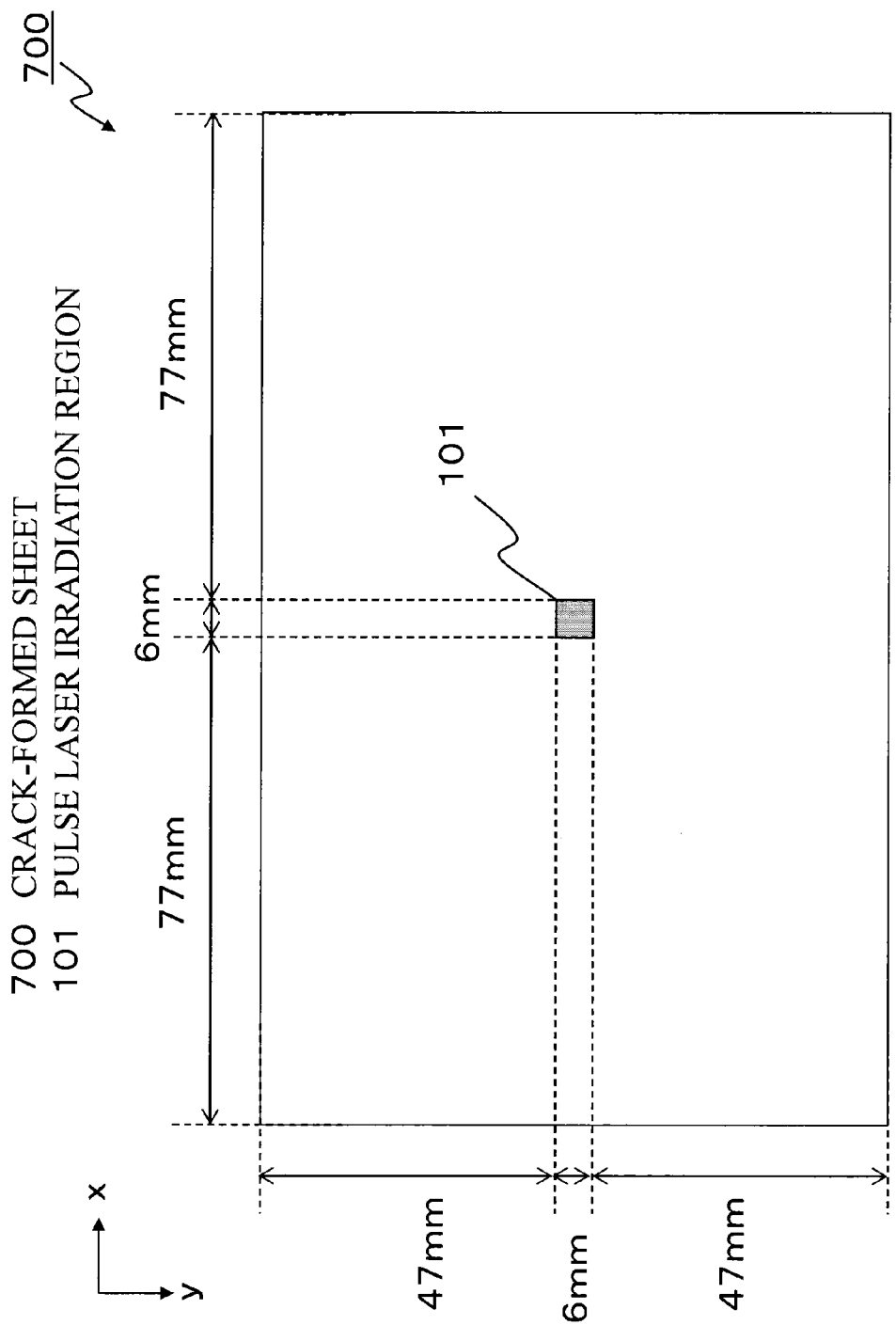
FIG. 7 is a schematic view of a crack-formed sheet that is manufactured in Examples.

A focal point of a pulse laser was adjusted to a position at the depth of 1.5 mm from a surface of the primary thermoplastic resin shaped-article by using the femtosecond laser processing apparatus 100, and the position was irradiated with the pulse laser under conditions in which a laser output was set to 30 mW and the number of irradiation pulses was set to of 2 pulses, thereby forming a crack only at the inside of the primary thermoplastic resin shaped-article. The pulse laser irradiation operation was further repeated 15 times while moving the automatic two-axis stage 10 to form cracks having an arrangement pattern as illustrated in FIG. 6 in a region (a pulse laser irradiation region 101 in FIG. 7) having dimensions of 6 mm×6 mm at the center of a main surface of the primary thermoplastic resin shaped-article, thereby obtaining a crack-formed sheet 700 illustrated in FIG. 7.

The crack-formed sheet 700 that was obtained had the crack center at a position at the depth of 1.5 mm from the main surface, the minimum diameter of the cracks was 17 μm, and the aspect ratio of the cracks was 10.7.

Subsequently, the outer periphery of the crack-formed sheet 700 was pinched by an aluminum holder, and the crack-formed sheet 700 was subjected to a heat treatment at 180° C. for 6.5 minutes by using a hot air dryer (product name: hot air circulating thermostatic dryer 41-S5, manufactured by Satake Chemical Equipment Mfg., Ltd.) to allow each of the cracks to grow into a vacancy, thereby obtaining a thermoplastic resin shaped-article having the vacancy.

Figure 8:
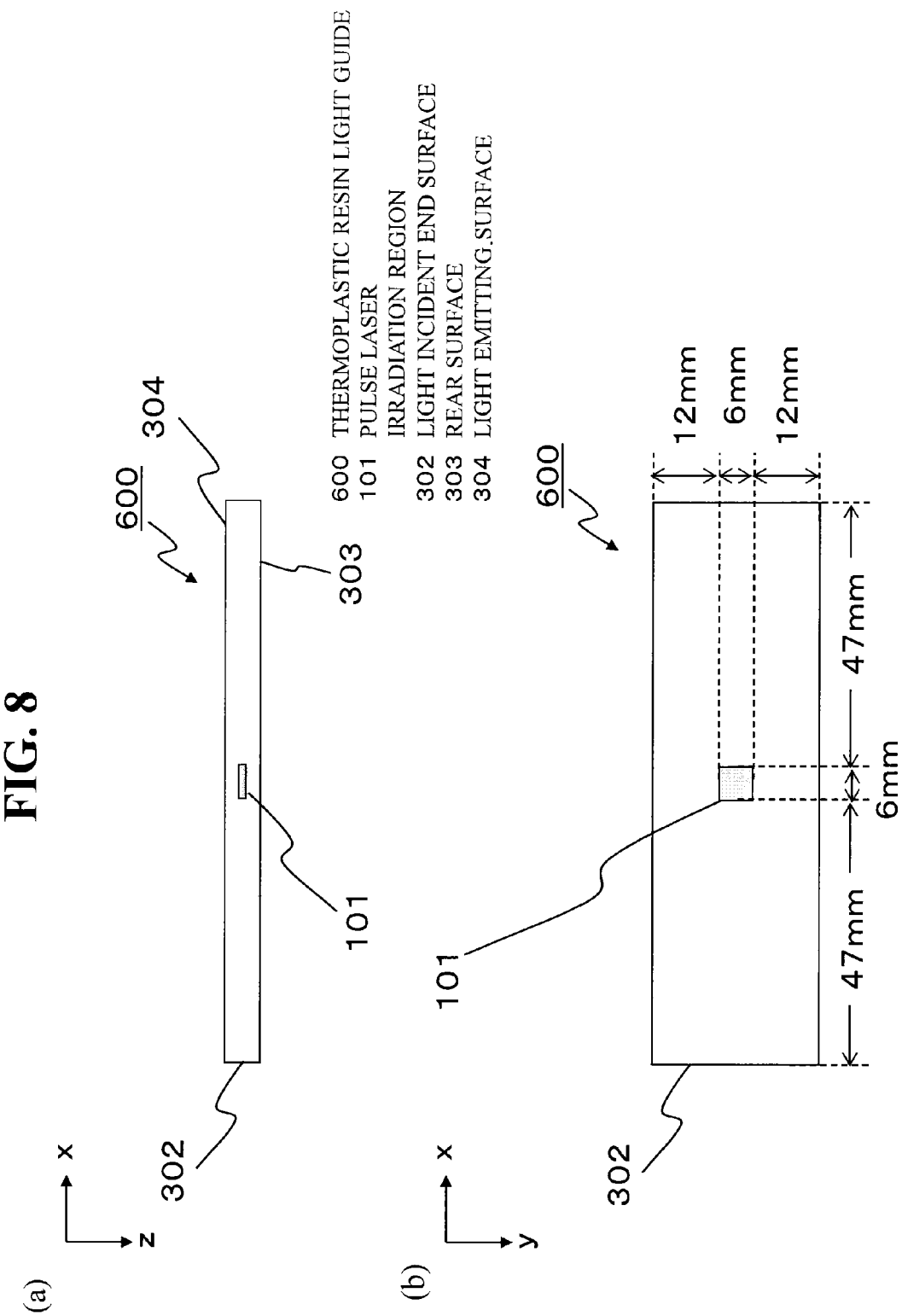
FIG. 8 is a schematic view of the thermoplastic resin light guide that is manufactured in Examples.

A test specimen for the thermoplastic resin light guide having the pulse laser irradiation region 101 at the center of the main surface was cut out from the thermoplastic resin shaped-article having the vacancy, and then all side end surfaces of the test specimen were ground into mirror surfaces by using a diamond bit, thereby manufacturing a thermoplastic resin light guide 600 having the size of 30 mm×100 mm as illustrated in FIG. 8.

The thermoplastic resin shaped-article and the thermoplastic resin light guide which were obtained had the vacancy center at a position at the depth of 1.5 mm from the main surface, the minimum diameter of the vacancy was 85 μm, and the aspect ratio of the vacancy was 2.4.

As illustrated in FIG. 5, a lamp of LED 340 (product name: white LED NSSW020BT, manufactured by NICHIA CORPORATION) was disposed to face a light incident end surface 302 of the thermoplastic resin light guide 600. A reflection sheet 310 (product name: Tetoron film UX, thickness: 225 μm, manufactured by Teijin DuPont Films Japan Limited) was disposed on a rear surface 303, which is opposite to a light emitting surface 304, to face the rear surface 303, thereby obtaining a light source device. Normal luminance in the light source device, which was obtained, was measured. The normal luminance was 6.3.

Incidentally, the normal luminance represents a relative value of a case where the normal luminance of a crack-formed sheet obtained in Comparative Example 1 to be described later is set to 1.0.

Processing conditions in the pulse laser irradiation and the heat treatment, and evaluation results of the thermoplastic resin light guide that was obtained are shown in Table 1.

Examples 2 to 4

Thermoplastic resin light guides were obtained in the same manner as in Example 1 except that the processing conditions in the heat treatment were set to conditions which are shown in Table 1. Evaluation results of the thermoplastic resin light guides are shown in Table 1.

Comparative Example 1

A crack-formed sheet was obtained in the same manner as in Example 1 except that the heat treatment was not performed. Evaluation results of the crack-formed sheet are shown in Table 1.

TABLE 1

| | Processing condition | | | | Evaluation result | | |
|---|---|---|---|---|---|---|---|
| | Pulse laser irradiation | | Heat treatment | | Minimum | | Normal |
| | Laser output (mW) | Number of irradiation pulses | Temperature (° C.) | Time (minute) | diameter (μm) | Aspect ratio | luminance (relative value) |
| Example 1 | 30 | 2 | 180 | 6.5 | 85 | 2.4 | 6.3 |
| Example 2 | | | | 8 | 135 | 1.8 | 14.9 |
| Example 3 | | | | 10 | 265 | 1.3 | 62.1 |
| Example 4 | | | | 11 | 413 | 1.1 | 143.0 |
| Comparative Example 1 | | | None | | 17 | 10.7 | 1.0 |

Examples 5 to 7

Thermoplastic resin light guides were obtained in the same manner as in Example 1 except that the processing conditions in the pulse laser irradiation and the heat treatment were set to conditions described in Table 2. Evaluation results of the thermoplastic resin light guides are shown in Table 2.

Incidentally, normal luminance is a relative value of a case where normal luminance of the crack-formed sheet obtained in Comparative Example 2 to be described later is set to 1.0.

Comparative Example 2

A crack-formed sheet was obtained in the same manner as in Example 5 except that the heat treatment was not performed. Evaluation results of the crack-formed sheet are shown in Table 2.

Figure 9:
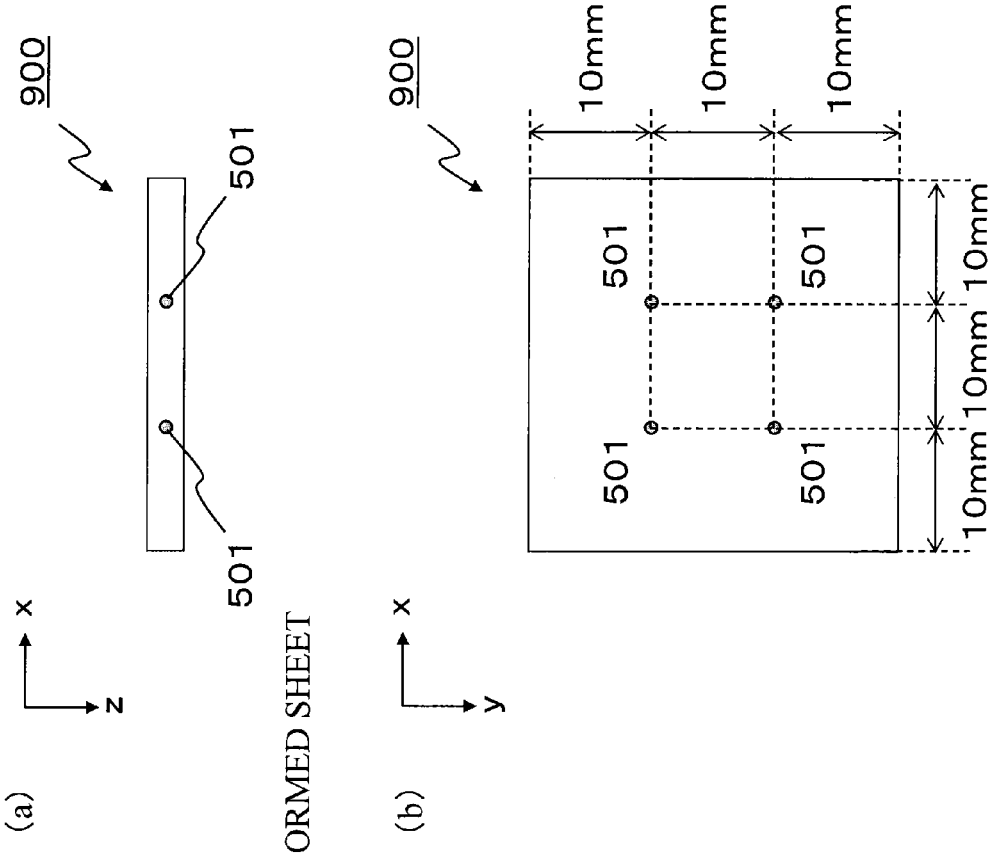
FIG. 9 is a schematic view of a crack-formed sheet that is manufactured in Reference Examples.

A focal point of a pulse laser was adjusted to a position at the depth of 1.5 mm from a surface of the primary thermoplastic resin shaped-article by using the femtosecond laser processing apparatus 100, and the position was irradiated with the pulse laser under conditions in which a laser output was set to 30 mW and the number of irradiation pulses was set to of 2 pulses, thereby forming a crack only at the inside of the primary thermoplastic resin shaped-article. The pulse laser irradiation operation was further repeated three times while moving the automatic two-axis stage 10 to form cracks 501 having an arrangement pattern as illustrated in FIG. 9, thereby obtaining a crack-formed sheet 900.

Subsequently, the outer periphery of the crack-formed sheet 900 was pinched by an aluminum holder, and the crack-formed sheet 900 was subjected to a heat treatment at a temperature and time which are shown in Table 3 by using a hot air dryer (product name: hot air circulating thermostatic dryer 41-S5, manufactured by Satake Chemical Equipment Mfg., Ltd.), thereby obtaining a thermoplastic resin

TABLE 2

| | Processing condition | | | | Evaluation result | | |
|---|---|---|---|---|---|---|---|
| | Pulse laser irradiation | | Heat treatment | | Minimum | | Normal |
| | Laser output (mW) | Number of irradiation pulses | Temperature (° C.) | Time (minute) | diameter (μm) | Aspect ratio | luminance (relative value) |
| Example 5 | 170 | 66 | 180 | 6.5 | 299 | 1.9 | 5.1 |
| Example 6 | | | | 8 | 410 | 1.6 | 8.1 |
| Example 7 | | | | 11 | 957 | 1.2 | 37.4 |
| Comparative Example 2 | | | None | | 89 | 5.6 | 1.0 |

Reference Example 1

An acrylic extruded sheet having a thickness of 3 mm was manufactured by using an acrylic resin pellet (product name: Acrypet VH6#001, mass-average molecular weight: 86000, glass transition temperature: 110° C., manufactured by Mitsubishi Rayon Co., Ltd.) as a raw material. Subsequently, the acrylic extruded sheet was cut into a rectangular shape having dimensions of 160 mm×100 mm, thereby obtaining a primary thermoplastic resin shaped-article.

shaped-article. Processing conditions and evaluation results of the thermoplastic resin shaped-article that was obtained are shown in Table 3.

Incidentally, minimum diameter and an aspect ratio in Reference Example represent an average of minimum diameters and an average value an aspect ratios of four vacancies which are formed inside the thermoplastic resin shaped-article, respectively.

Figure 10:
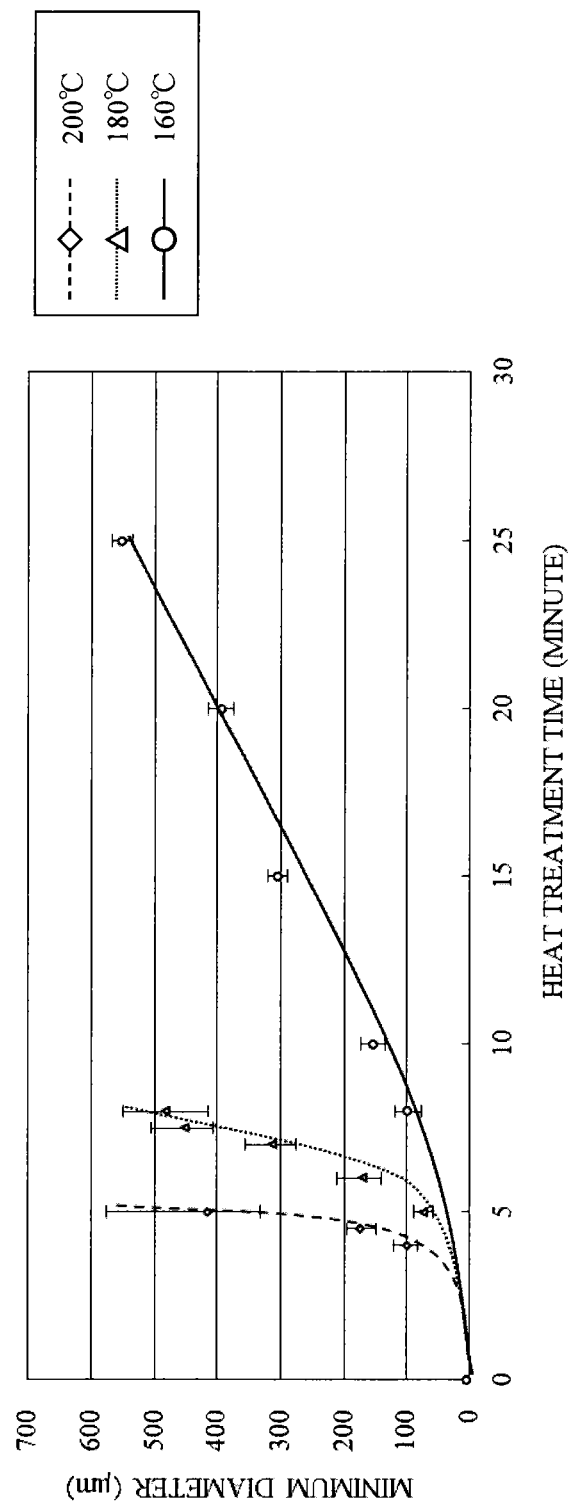
FIG. 10 is a graph illustrating a relationship between time taken for a heat treatment of the thermoplastic resin shaped-article at various heat treatment temperatures, and the minimum diameter of a vacancy inside the thermoplastic resin shaped-article in Reference Example 1.

A relationship between a heat treatment time and minimum diameter of the vacancies at each heat treatment temperature is illustrated in FIG. 10. Incidentally, an error bar in FIG. 10 represents a variation range in the minimum diameter of four vacancies.

TABLE 3

| | Processing condition | | | | Evaluation result | |
|---|---|---|---|---|---|---|
| | Pulse laser irradiation | | Heat treatment | | Minimum | |
| | Laser output (mW) | Number of irradiation pulses | Temperature (° C.) | Time (minute) | diameter (μm) | Aspect ratio |
| Condition 1 | 30 | 2 | 160 | 8 | 100 | 2.5 |
| Condition 2 | | | | 10 | 155 | 1.7 |
| Condition 3 | | | | 15 | 304 | 1.2 |
| Condition 4 | | | | 20 | 394 | 1.1 |
| Condition 5 | | | | 25 | 552 | 1.1 |
| Condition 6 | | | 180 | 5 | 73 | 2.7 |
| Condition 7 | | | | 6 | 171 | 1.5 |
| Condition 8 | | | | 7 | 313 | 1.2 |
| Condition 9 | | | | 7.5 | 453 | 1.1 |
| Condition 10 | | | | 8 | 481 | 1.1 |
| Condition 11 | | | 200 | 4 | 101 | 1.8 |
| Condition 12 | | | | 4.5 | 174 | 1.4 |
| Condition 13 | | | | 5 | 417 | 1.1 |
| Condition 14 | | | None | | 6 | 29.1 |

Reference Example 2

A thermoplastic resin shaped-article was obtained in the same manner as in Reference Example 1 except that the processing conditions in the pulse laser irradiation and the heat treatment were set to conditions described in Table 4. Evaluation results are shown in Table 4.

Figure 11:
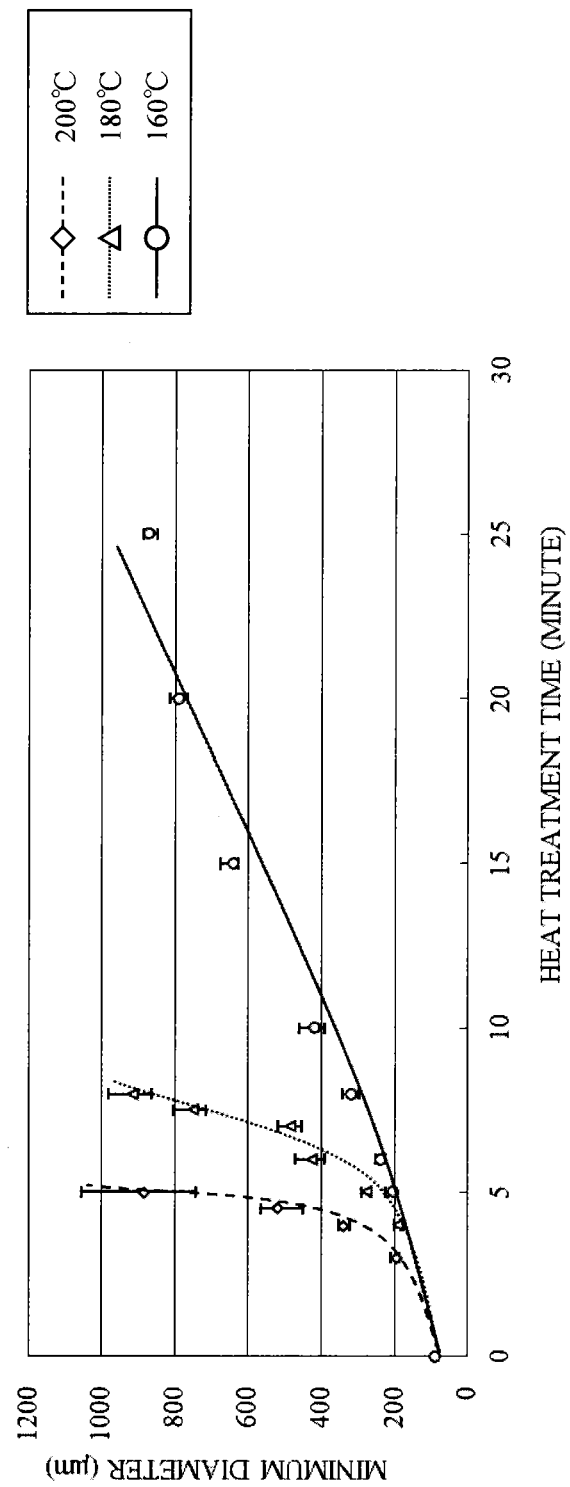
FIG. 11 is a graph illustrating a relationship between time taken for a heat treatment of the thermoplastic resin shaped-article at various heat treatment temperatures, and the minimum diameter of a vacancy inside the thermoplastic resin shaped-article in Reference Example 2.

A relationship between a heat treatment time and minimum diameter of vacancies at each heat treatment temperature is illustrated in FIG. 11. Incidentally, an error bar in FIG. 11 represents a range of a variation in minimum diameter of the four vacancies.

An optical microscope photograph when observing vacancies, which were obtained under condition 27 as an example of the vacancy, from the z-axis direction and the y-axis direction is illustrated in FIG. 12.

TABLE 4

| | Processing condition | | | | Evaluation result | |
|---|---|---|---|---|---|---|
| | Pulse lase: irradiation | | Heat treatment | | Minimum | |
| | Laser output (mW) | Number of irradiation pulses | Temperature (C.) | Time (minute) | diameter (μm) | Aspect ratio |
| Condition 15 | 170 | 66 | 160 | 5 | 205 | 2.6 |
| Condition 16 | | | | 6 | 237 | 2.2 |
| Condition 17 | | | | 8 | 320 | 1.8 |
| Condition 18 | | | | 10 | 418 | 1.5 |
| Condition 19 | | | | 15 | 647 | 1.3 |
| Condition 20 | | | | 20 | 792 | 1.2 |
| Condition 21 | | | | 25 | 875 | 1.2 |
| Condition 22 | | | 180 | 4 | 191 | 2.9 |
| Condition 23 | | | | 5 | 277 | 2.2 |
| Condition 24 | | | | 6 | 428 | 1.6 |
| Condition 25 | | | | 7 | 484 | 1.6 |
| Condition 26 | | | | 7.5 | 749 | 1.3 |
| Condition 27 | | | | 8 | 918 | 1.3 |
| Condition 28 | | | 200 | 3 | 194 | 2.6 |
| Condition 29 | | | | 4 | 336 | 2.0 |
| Condition 30 | | | | 4.5 | 518 | 1.5 |
| Condition 31 | | | | 5 | 884 | 1.3 |
| Condition 32 | | | None | | 89 | 6.8 |

As is clear from Tables 3 and 4, and FIGS. 10 and 11, it can be seen that it is possible to form vacancies inside the thermoplastic resin shaped-article by the manufacturing method according to Examples of the invention without using an additive. In addition, it can be seen that it is possible to form vacancies having arbitrary minimum diameter and arbitrary aspect ratio by controlling processing conditions in the pulse laser irradiation and the heat treatment.

In addition, as is clear from FIGS. 10 and 11, as the heat treatment temperature is high, time necessary to form the vacancy is shortened, but a variation in vacancy dimensions has a tendency to increase. On the other hand, as the heat treatment temperature is low, time necessary to form the vacancy is lengthened, but the variation in the vacancy dimensions has a tendency to decrease (that is, it is easy to form vacancies having uniform size).

Reference Example 3

Minimum diameter and aspect ratio of vacancies were obtained in the same manner as in Reference Example 1 except that the processing conditions in the pulse laser irradiation and the heat treatment were set to conditions described in Table 5. However, a muffle furnace (product name: EPTS-11K, manufactured by Isuzu Seisakusho Co., Ltd.) was used during the heat treatment. Evaluation results are shown in Table 5.

TABLE 5

| | Processing condition | | | | Evaluation result | |
|---|---|---|---|---|---|---|
| | Pulse laser irradiation | | Heat treatment | | Minimum | |
| | Laser output (mW) | Number of irradiation pulses | Temperature (C.) | Time (minute) | diameter (μm) | Aspect ratio |
| Condition 33 | 100 | 10,000 | 150 | 60 | 367 | 2.0 |
| Condition 34 | | | 100 | 60 | 192 | 3.7 |
| Condition 35 | | | None | | 180 | 3.8 |

As is clear from Table 5, in the case of performing the heat treatment at a heating temperature equal to or lower than the glass transition temperature of the thermoplastic resin that constitutes the thermoplastic resin shaped-article, it was difficult to form vacancies having aspect ratio of 3 or less.

EXPLANATIONS OF LETTERS OR NUMERALS

1: Femtosecond laser light source
2: Half-wavelength plate
3: Glan laser prism

4: Shutter
5, 5', 5": Mirror
6: Objective lens
7: Femtosecond laser light
8: Primary thermoplastic resin shaped-article
9: z-axis stage
10: Automatic two-axis stage
20: Thermoplastic resin shaped-article
22, 340: LED
24, 600: Thermoplastic resin light guide
26: Light diffusion element
28: First light deflection element
30: Second light deflection element
32: Light reflection element
100: Femtosecond laser processing apparatus
101: Pulse laser irradiation region
241, 302: Light incident end surface
242, 304: Light emitting surface
243, 303: Rear surface
244: Vacancy
300: Luminance measurement region
310: Reflection sheet
320: Mask
360: Luminance meter
501: Crack
700, 900: Crack-formed sheet
1301: Core
1302: Clad

The invention claimed is:

1. A thermoplastic resin shaped-article, comprising:
substantially spherical vacancies having a minimum diameter of 30 μm or more only at an inner region distant from a surface of the thermoplastic resin shaped-article by 10 μm or more,
wherein the substantially spherical vacancies comprise a decomposition product gas of a thermoplastic resin that constitutes the thermoplastic resin shaped-article.

2. The thermoplastic resin shaped-article according to claim 1,
wherein the thermoplastic resin shaped-article has transparency.

3. A thermoplastic resin light guide comprising the thermoplastic resin shaped-article according to claim 1, further comprising:
a light incident end surface, to which a light to be guided to the inside, is incident; and
a light emitting surface, from which the light is emitted, wherein the thermoplastic resin shaped-article has a haze value of 5% or less.

4. The thermoplastic resin light guide according to claim 3,
wherein the thermoplastic resin light guide has a core-clad structure.

5. A light source device, comprising:
the thermoplastic resin light guide according to claim 4; and
a primary light source that is provided to the thermoplastic resin light guide,
wherein the primary light source is disposed adjacent to the light incident end surface.

6. A liquid crystal display device, comprising:
the light source device according to claim 5.

7. A light source device, comprising:
the thermoplastic resin light guide according to claim 3; and
a primary light source that is provided to the thermoplastic resin light guide,
wherein the primary light source is disposed adjacent to the light incident end surface.

8. A liquid crystal display device, comprising:
the light source device according to claim 7.

9. The thermoplastic resin shaped-article according to claim 1,
wherein the thermoplastic resin that constitutes the thermoplastic resin shaped-article is selected from an acrylic resin, a polycarbonate resin, a methacrylic acid ester-styrene copolymer, a cyclic olefin resin, and an ABS resin.

10. The thermoplastic resin shaped-article according to claim 1,
wherein the thermoplastic resin that constitutes the thermoplastic resin shaped-article is an acrylic resin.

11. The thermoplastic resin shaped-article according to claim 1,
wherein the substantially spherical vacancies have a maximum diameter of 20 mm.

12. The thermoplastic resin shaped-article according to claim 11, wherein the substantially spherical vacancies have an aspect ratio of 3 or less.

13. The thermoplastic resin shaped-article according to claim 1,
wherein the substantially spherical vacancies have a minimum diameter of 50 μm and a maximum diameter of 20 mm.

14. The thermoplastic resin shaped-article according to claim 1,
wherein the substantially spherical vacancies have a minimum diameter of 70 μm and a maximum diameter of 20 mm.

15. A thermoplastic resin shaped-article, comprising:
substantially spherical vacancies having a minimum diameter of 30 μm or more only at an inner region distant from a surface of the thermoplastic resin shaped-article by 10 μm or more, the surface acting as a light emitting surface,
wherein:
the substantially spherical vacancies comprise a decomposition product gas of a thermoplastic resin that constitutes the thermoplastic resin shaped-article,
the thermoplastic resin shaped-article is obtained through a pulse laser irradiation process and a subsequent heat treatment process,
in the pulse laser irradiation process, pulse laser irradiation is performed in a state in which a pulse laser is focused to the inner region, and cracks are formed only at the inner region, and
in the subsequent heat treatment process, the thermoplastic resin shaped-article is subjected to heat treatment at a temperature equal to or higher than the glass transition temperature of a thermoplastic resin that constitutes the thermoplastic resin shaped-article.

16. A method of manufacturing a thermoplastic resin shaped-article, comprising:
performing pulse laser irradiation focusing a pulse laser on an inner region of the thermoplastic resin shaped-article which is distant from a surface of the thermoplastic resin-shaped article by 10 μm or more, and forming cracks only at the inner region, and
subsequently heat treating the thermoplastic resin shaped-article at a temperature equal to or higher than the glass transition temperature of a thermoplastic resin that constitutes the thermoplastic resin shaped-article, and forming substantially spherical vacancies having a minimum diameter of 30 μm at the inner region and are distant from the surface by 10 μm or more.

17. The method according to claim 16,
wherein the pulse laser has a wavelength of 1080 nm or less, a pulse width of 200 femtoseconds or less, and energy of 5 μJ/pulse or more.

18. The method according to claim 16,
wherein the thermoplastic resin shaped-article is heat treated for 3 minutes to 30 minutes.

19. The method according to claim 16,
wherein the temperature is equal to or 30° C. higher than the glass transition temperature of the thermoplastic resin.

20. A thermoplastic resin light guide, comprising:
a light incident end surface, to which a light to be guided to the inside, is incident; and
a light emitting surface, from which the light is emitted, wherein:
the thermoplastic resin light guide comprises a thermoplastic resin shaped-article,
the thermoplastic resin shaped-article has a haze value of 5% or less, and comprises substantially spherical vacancies,
the substantially spherical vacancies have a minimum diameter of 30 μm or more and are formed only at an inner region distant from the light emitting surface by 10 μm or more,
and the substantially spherical vacancies comprise a decomposition product gas of a thermoplastic resin that constitutes the thermoplastic resin shaped-article.

* * * * *